(12) United States Patent
Croak et al.

(10) Patent No.: US 8,199,742 B1
(45) Date of Patent: Jun. 12, 2012

(54) METHOD AND APPARATUS FOR ENABLING A RETAILER TO SEND A PROMOTIONAL ANNOUNCEMENT TO CUSTOMERS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1588 days.

(21) Appl. No.: 11/211,242

(22) Filed: Aug. 25, 2005

(51) Int. Cl.
- *H04L 12/66* (2006.01)
- *H04M 15/00* (2006.01)
- *H04M 11/00* (2006.01)

(52) U.S. Cl. .......... 370/352; 379/114.13; 379/93.13

(58) Field of Classification Search .......... 370/352; 705/14; 379/265.01, 265.09, 221.09, 114.11–114.13, 379/211.01, 214.01, 93.12–93.13, 114.1, 379/114.2

See application file for complete search history.

(56) References Cited

U.S. PATENT DOCUMENTS

| | | | |
|---|---|---|---|
| 5,983,196 A * | 11/1999 | Wendkos | 705/14.14 |
| 6,415,262 B1 * | 7/2002 | Walker et al. | 705/14.25 |
| 6,434,224 B1 * | 8/2002 | Nagashima et al. | 379/93.23 |
| 6,516,302 B1 * | 2/2003 | Deaton et al. | 705/14.38 |
| 7,254,548 B1 * | 8/2007 | Tannenbaum | 705/18 |
| 7,618,318 B2 * | 11/2009 | Ciancio et al. | 463/25 |
| 7,770,786 B1 * | 8/2010 | Birch et al. | 235/379 |
| 8,019,692 B2 * | 9/2011 | Rosen | 705/319 |
| 2002/0077904 A1 * | 6/2002 | Ali | 705/14 |
| 2003/0002657 A1 * | 1/2003 | Seelig et al. | 379/373.01 |
| 2003/0218535 A1 * | 11/2003 | Khoshbin | 340/7.53 |
| 2004/0117225 A1 * | 6/2004 | Fridman | 705/7 |
| 2004/0219971 A1 * | 11/2004 | Ciancio et al. | 463/25 |
| 2005/0242180 A1 * | 11/2005 | Byford | 235/385 |
| 2005/0288998 A1 * | 12/2005 | Verma et al. | 705/14 |
| 2006/0233339 A1 * | 10/2006 | Schwartz | 379/207.02 |
| 2006/0259424 A1 * | 11/2006 | Turcotte et al. | 705/40 |
| 2006/0277103 A1 * | 12/2006 | Fujita et al. | 705/14 |
| 2007/0043582 A1 * | 2/2007 | Peveto et al. | 705/1 |
| 2009/0046704 A1 * | 2/2009 | Sternam | 370/352 |
| 2009/0138365 A1 * | 5/2009 | Mueller et al. | 705/14 |

* cited by examiner

*Primary Examiner* — William Deane, Jr.

(57) ABSTRACT

A method and apparatus for enabling a retailer to track shoppers by a customer's phone number are disclosed. When the customer reaches a purchase target, e.g., a predefined amount of money spent at the retailer, the present invention enables a trigger to place an outbound call to the customer to present a promotional announcement, e.g., inviting the customer to come into the store of the retailer and to receive a discount at the point of sale.

14 Claims, 4 Drawing Sheets

METHOD AND APPARATUS FOR ENABLING A RETAILER TO SEND A PROMOTIONAL ANNOUNCEMENT TO CUSTOMERS

The present invention relates generally to communication networks and, more particularly, to a method and apparatus for enabling retailers to send promotional announcements to customers in communication networks, e.g. packet networks such as Voice over Internet Protocol (VoIP) networks.

BACKGROUND OF THE INVENTION

Retailers at the point of sale frequently ask shoppers for their phone number in order to track their purchases and offer them special bonuses when their purchases reach a certain target. The customer's phone number is typically used to look up address information so that the retailer can send the customer coupons and promotions by mail. Compared to the cost of a phone call, the cost of the mail campaign and the cost of printing the promotional materials can be higher.

Therefore, a need exists for a method and apparatus for enabling retailers to send promotional announcements to customers in a packet network, e.g., a VoIP network.

SUMMARY OF THE INVENTION

In one embodiment, the present invention enables a retailer to track customers by the customer's phone number. When the customer reaches a purchase target, e.g., a predefined amount of money spent at the retailer, the present invention enables a trigger to place an outbound call to the customer to present a promotional announcement, e.g., inviting the customer to come into the store of the retailer and to receive a discount at the point of sale. This saves the retailer the expense of a mail campaign and the associated expenses of printing the promotional materials.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
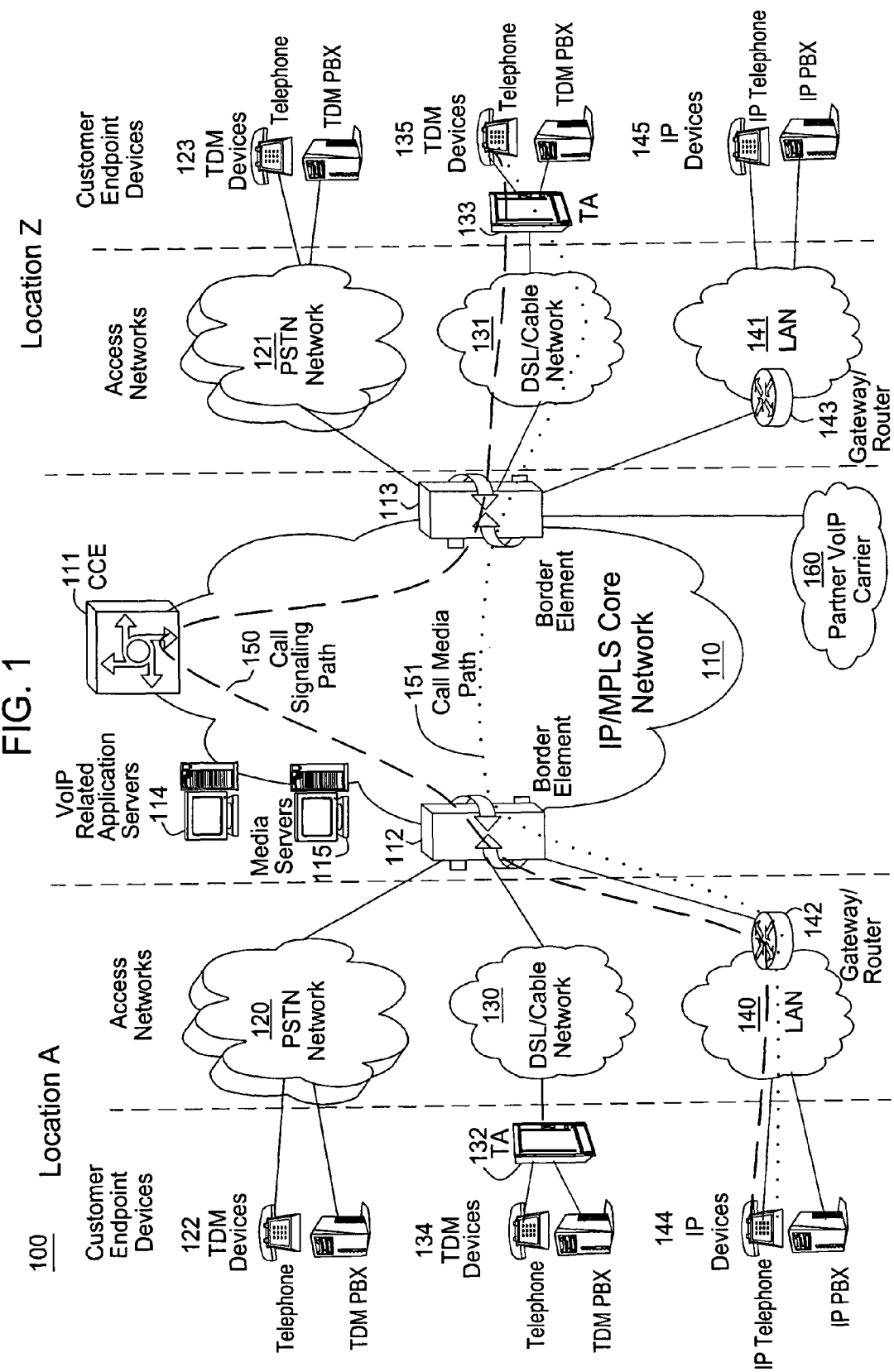
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Retailers at the point of sale frequently ask shoppers for their phone number in order to track their purchases and offer them special bonuses when their purchases reach a certain target. The customer's phone number is typically used to look up address information so that the retailer can send the customer coupons and promotions by mail. Compared to the cost of a phone call, the cost of the mail campaign and the cost of printing the promotional materials can be higher.

To address this need, the present invention enables a retailer to track customers by the customer's phone number. When the customer reaches a purchase target, e.g., a predefined amount of money spent at the retailer, the present invention enables a trigger to place an outbound call to the customer to present a promotional announcement, e.g., inviting the customer to come into the store and to receive a discount at the point of sale. This saves the retailer the expense of a mail campaign and the associated expenses of printing the promotional materials.

Figure 2:
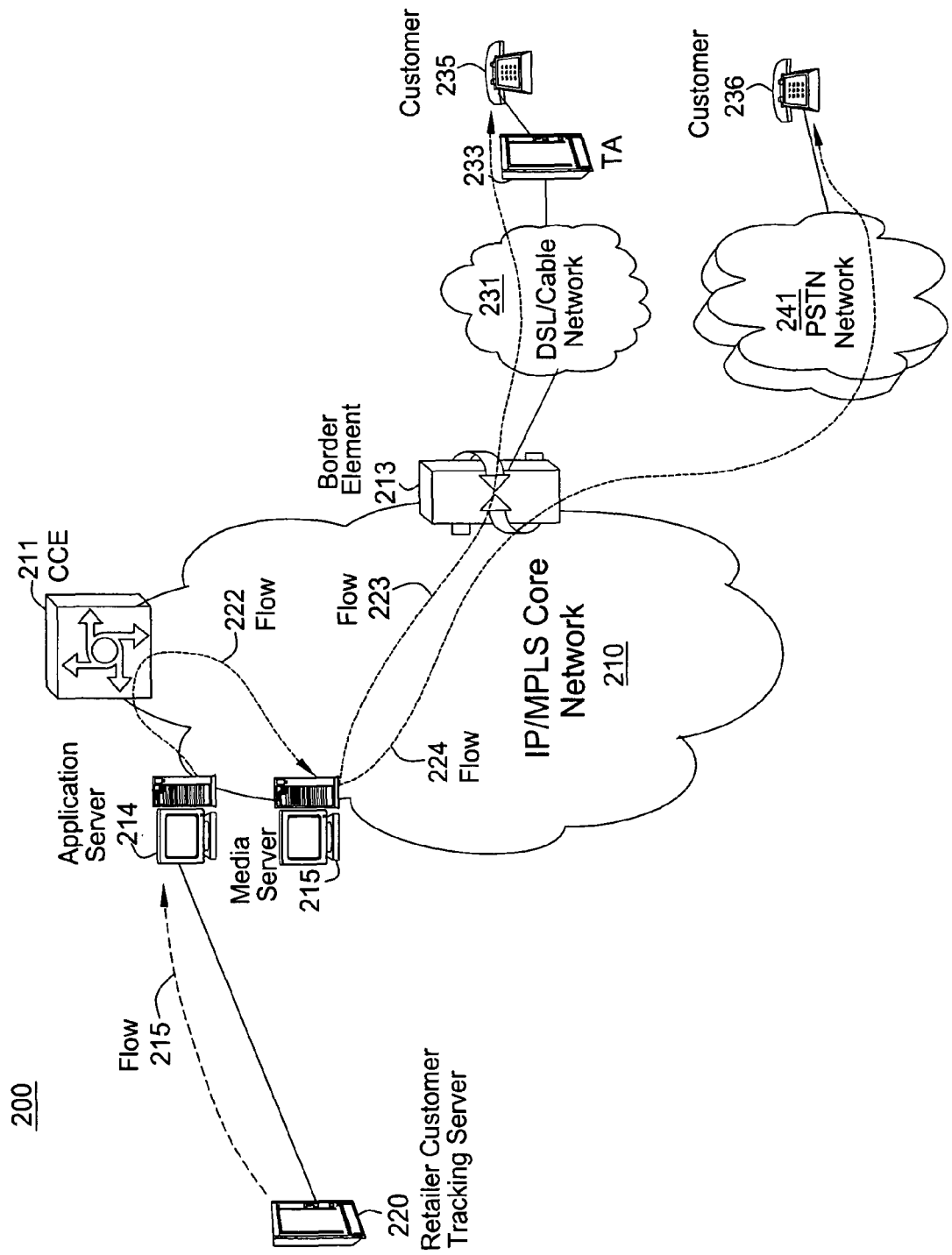
FIG. 2 illustrates an example of enabling retailers to send promotional announcements to customers in a VoIP network related to the present invention.

FIG. 2 illustrates a system 200 that enables retailers to send promotional announcements to customers via a packet network, e.g., a VoIP network. In FIG. 2, a retailer customer tracking server 220 continuously tracks all purchases made by customers using their phone number. Periodically, retailer customer tracking server 220 sends the tracked purchase information using flow 221 to AS 214 to be updated. AS 214 monitors if a customer purchase exceeds a predefined target set by the retailer. When a customer's purchases exceed the predefined target, AS 214 instructs MS 215 using flow 222 via CCE 211 to place an outbound call to the customer to present a promotional announcement, e.g., offering the customer a special discount using a pre-recorded announcement. In one instance, MS 215 places an outbound call to a VoIP customer 235, using flow 223 via BE 213, access network 231 and TA 233 to play the pre-recorded announcement. In another instance, MS 215 places an outbound call to a PSTN customer 236, using flow 224 via BE 213 and access network 241 to play the pre-recorded announcement. Once the customer receives the discount offer announcement, the customer can go to a retail location of the retailer to receive the special discount at the point of sale.

Figure 3:
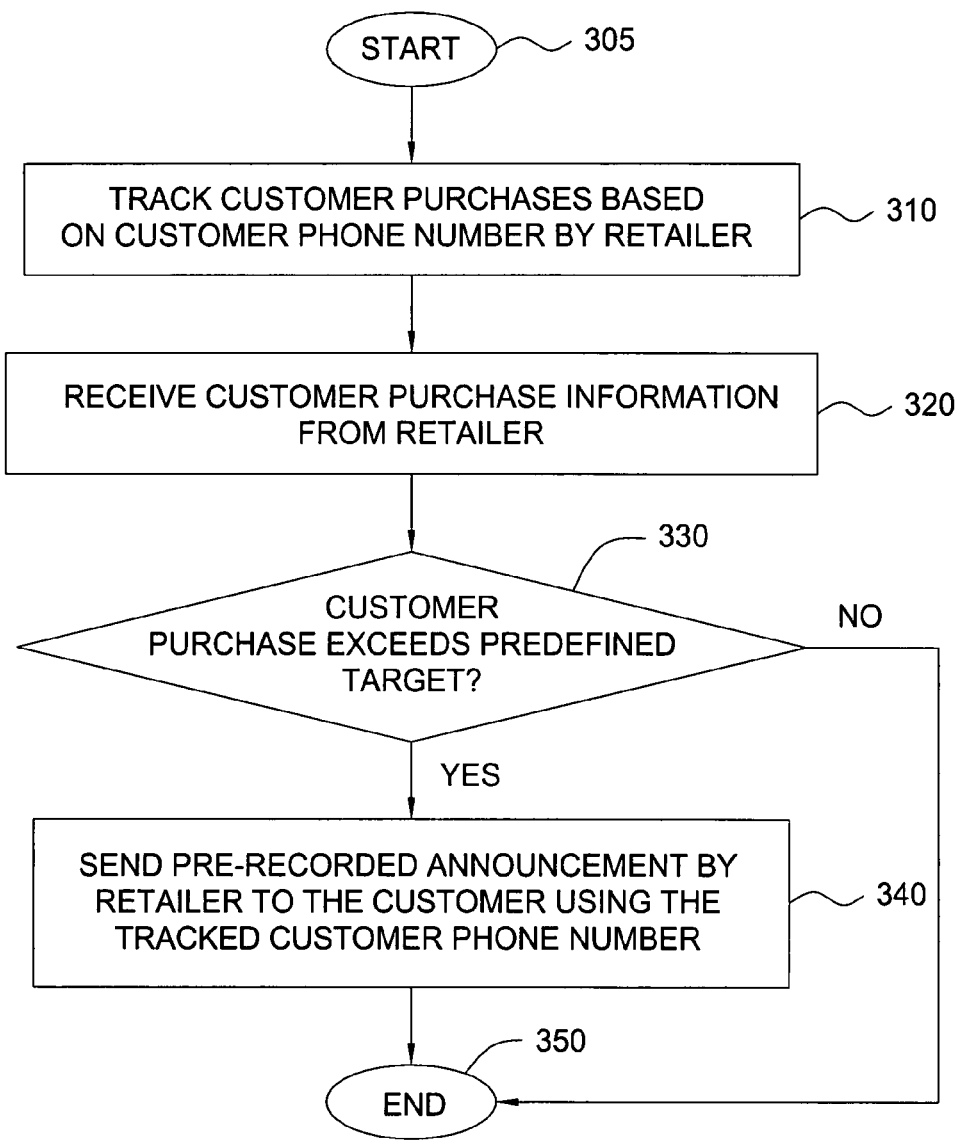
FIG. 3 illustrates a flowchart of a method for enabling retailers to send promotional announcements to customers in a VoIP network of the present invention.

FIG. 3 illustrates a flowchart of a method 300 for enabling retailers to send promotional announcements to customers via a packet network, e.g., a VoIP network of the present invention. Method 300 starts in step 305 and proceeds to step 310.

In step 310, the method tracks a customer's purchases based on the customer phone number provided by a retailer. In step 320, the method receives customer purchase information from the retailer. In step 330, the method checks whether a customer's purchases have exceeded a predefined target set by the retailer, e.g., an amount of money spent for a particular period of time, e.g., a week, a month, a quarter and so on. If the purchase target is exceeded, the method proceeds to step 340; otherwise, the method proceeds to step 350. In step 340, the method sends a pre-recorded announcement prepared by or for the retailer to the customer using the tracked customer phone number. The method ends in step 350.

Figure 4:
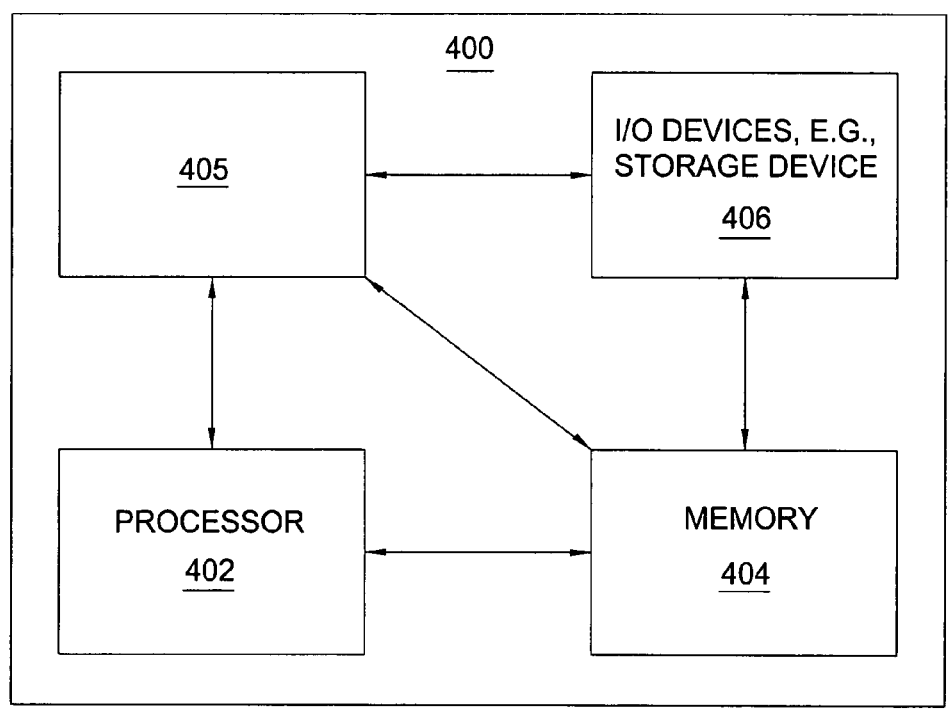
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a promotional announcement module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present promotional announcement module or process 405 can be loaded into memory 404 and executed by processor 402 to implement the functions as discussed above. As such, the present promotional announcement process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling a retailer to send a promotional announcement to a customer via a communication network, comprising:

receiving purchase information pertaining to purchases of the customer made with the retailer, wherein the purchases are associated with a phone number of the customer; and sending automatically an outbound call comprising a pre-recorded announcement via the communication network to the customer via the phone number if the purchases exceed a predefined purchase target, wherein the pre-recorded announcement is generated by a media server in the communication network, wherein the pre-recorded announcement comprises a promotional offer made by the retailer based upon the purchases exceeding the predefined purchase target.

2. The method of claim 1, wherein the communication network is an internet protocol network.

3. The method of claim 1, wherein the purchase information is tracked, by the retailer, using a retailer customer tracking server based on the phone number of the customer; and sending the purchase information to the communication network.

4. The method of claim 3, wherein the purchase information is received by an application server in the communication network.

5. The method of claim 1, wherein the promotional offer is claimed at a point of sale of the retailer.

6. A computer-readable medium having stored thereon a plurality of instructions, the plurality of instructions including instructions which, when executed by a processor, cause the processor to perform a method for enabling a retailer to send a promotional announcement to a customer via a communication network, comprising:

receiving purchase information pertaining to purchases of the customer made with the retailer, wherein the purchases are associated with a phone number of the customer; and sending automatically an outbound call comprising a pre-recorded announcement via the communication network to the customer via the phone number if the purchases exceed a predefined purchase target, wherein the pre-recorded announcement is generated by a media server in the communication network, wherein the pre-recorded announcement comprises a promotional offer made by the retailer based upon the purchases exceeding the predefined purchase target.

7. The computer-readable medium of claim 6, wherein the communication network is an internet protocol network.

8. The computer-readable medium of claim 6, wherein the purchase information is tracked, by the retailer, using a retailer customer tracking server based on the phone number of the customer; and sending the purchase information to the communication network.

9. The computer-readable medium of claim 8, wherein the purchase information is received by an application server in the communication network.

10. The computer-readable medium of claim 6, wherein the promotional offer is claimed at a point of sale of the retailer.

11. An apparatus for enabling a retailer to send a promotional announcement to a customer via a communication network, comprising:

a processor; and a computer-readable medium in communication with the processor, wherein the computer-readable medium has stored thereon a plurality of instructions, the plurality of instructions including instructions which, when executed by the processor, cause the processor to perform a method, comprising:

receiving purchase information pertaining to purchases of the customer made with the retailer, wherein the purchases are associated with a phone number of the customer; and sending automatically an outbound call comprising a pre-recorded announcement via the communication network to the customer via the phone number if the purchases exceed a predefined purchase target, wherein the pre-recorded announcement is generated by a media server in the communication network, wherein the pre-recorded announcement comprises a promotional offer made by the retailer based upon the purchases exceeding the predefined purchase target.

12. The apparatus of claim 11, wherein the communication network is an internet protocol network.

13. The apparatus of claim 11, wherein the purchase information is tracked, by the retailer, using a retailer customer tracking server based on the phone number of the customer; and sending the purchase information to the communication network.

14. The apparatus of claim 13, wherein the purchase information is received by an application server in the communication network.

* * * * *